Patented Apr. 8, 1941

2,237,365

UNITED STATES PATENT OFFICE 2,237,365

PRODUCTION OF OXIMES

Paul Schlack, Berlin-Treptow, Germany, assignor to I. G. Farbenindustrie Aktiengesellschaft, Frankfort-on-the-Main, Germany No Drawing. Application November 27, 1939, Serial No. 306,427. In Germany November 28, 1938

10 Claims. (Cl. 260—566)

The present invention relates to the production of oximes and more particularly to a process for continuously producing oximes on a technical scale.

The formation of oximes, especially those of ketoximes, from carbonyl compounds and hydroxylamine does not proceed with a quantitative yield, if stoichiometric proportions are used in aqueous solutions. A certain excess of one of the reactants is therefore necessary in order to complete the reaction with the maximum yield, especially when the resultant oxime is substantially soluble in water.

When aqueous hydroxylamine salt solutions as obtained by the Raschig process are used, the employment of an excess of the carbonyl compound suggests itself. However, oximes obtained by this procedure contain impurities in the form of unreacted carbonyl compound which can usually only be separated by complicated procedures. If the oximes are precipitated in solid form they show a disposition to form lumps owing to the depression of the melting point effected by the excess carbonyl compound. Difficulties in filtering and drying the crystallized oximes arise since a part thereof usually remains oily. When aldehydes are employed for instance, benzaldehyde, a further disadvantage resides in the fact that the crude products oxidize rapidly in air.

It is an object of the present invention to overcome the above described difficulties.

A further object of the invention is the provision of a continuous process for producing oximes free from impurities and having the theoretical melting point.

A further object of the invention is to provide a novel process for producing oximes in hitherto unattained high yields.

Further objects of the present invention will become apparent from the following detailed description.

I have found that the reaction of carbonyl compounds with aqueous hydroxylamine or hydroxylamine salt solutions can be carried out on a large scale, with practically quantitive or at least very good yields with the production of a very pure product useful for most purposes without further purification, by mixing the aqueous hydroxylamine or hydroxylamine salt solution with less than the stoichiometric proportion of the carbonyl compound and if desired with a solvent for the resultant oxime, approximately neutralizing the mixture, separating the oxime formed, and completing the reaction with an excess of the carbonyl compound, at the same time adding another portion of a neutralizing agent. If salts of hydroxylamine in solution are employed for the reaction the first neutralization must be carried out with stirring and cooling.

The process can be carried out continuously both with free hydroxylamine and with hydroxylamine salt solution, the continuous process may then comprise the first step alone or the first and second steps. An example of the continuous procedure is given below. The large scale process is facilitated by the addition of emulsifying agents and protective colloids insensitive to salts, for instance hydroxy-ethylated alkylphenols, salts of polyacrylic acid, and soluble protein substances as for instance glue.

The first batch of oxime separated, the quantity of which can be up to 98% of the theoretical yield based on the ketone used, consists of a pure or nearly pure product if the carbonyl compound is of good quality. If several carbonyl compounds, for instance, an isomeric mixture, are employed, however, the product consists of an oxime mixture free from carbonyl compounds, which mixture has a constant composition. In both cases the products can be used directly for further operations without having to employ complicated purification techniques. If some purification is needed, the product may be dried, taken up in a solvent, melted, or subjected to simple distillation; i. e., methods which per se would not be sufficient to produce a separation from the carbonyl compound. Slight quantities of impurities present in the original carbonyl compound, for example, alcohols, have usually no adverse effect on the utility of the oximes in further operations.

The mixture formed during the second reaction step, which consists of oxime, carbonyl compound, and impurities, for instance, alcohols, is separated from the aqueous lye by decanting, extracting, absorbing, or in the simplest way by steam distillation and can be further worked up in different ways depending upon its composition. If it consists only of carbonyl compound and oxime, it can be advantageously added to the ketone which is to be used in the next run. This procedure makes it possible to operate the process continuously. If on the other hand this mixture contains noncarbonyl compounds, for instance, alcohols, these must be separated from the oxime before addition to the next batch in order to prevent their accumulation. The separation may be accomplished by caustic lye extraction of the oxime. The alkaline oxime solution can be returned to the first step in the process. The mixtures of carbonyl compounds and alcohols can be reconverted into carbonyl compounds by dehydrogenation. Pure mixtures of carbonyl compounds and oximes can be obtained by removing alcoholic impurities by distilling over phthalic anhydride and returning the mixture to the first step in the process.

The process is of special practical value for the production of cyclic ketoximes such as the oximes of cyclohexanone or cycloheptanone and substitution products thereof, for instance, the isomeric methyl cyclohexanones or the ketones of the tetrahydronaphthalene series. The oximes of these ketones can be converted into useful products such as lactams by Beckmann rearrangement. In these rearrangements, which as a rule are carried out in the presence of sulfuric acid, the presence of free carbonyl compounds must be avoided since these lead to resin formation.

*Example 1*

In a tank provided with a cooling jacket a solution of 38 moles of hydroxylaminesulfate in 15 liters of water is stirred with 7 kilos of cyclohexanone (containing 2 per cent of cyclohexanol) and a potassium carbonate solution of 33 per cent strength is added at temperatures between 0° C. and 10° C., until Congo red paper is just no longer dyed blue, while the solution remains acid to litmus. The mixture, which has become pulpy because of the separated oxime crystals, is stirred for another 30 minutes, filtered and carefully washed with as little water as possible. To the filtrate there is added immediately another 0.7 kilogram of cyclohexanone and the neutralizing continued at about 10° C. until the solution again only just reacts acid to litmus. The last neutralization of the acid can advantageously be carried out with alkali metal acetate or another buffer salt.

The non-aqueous phase consisting of cyclohexanone, cyclohexanoneoxime and cyclohexanol is removed by distilling with steam. The oxime is extracted from the oil layer in the distillate by means of lye and returned together with the lye into the first step of the process. The mixture of ketone and alcohol which is free from oxime is converted into pure ketone by dehydrogenation. The cyclohexanoneoxime obtained in practically quantitative yield is chemically pure. In the same manner the oximes of the isomeric methyl cyclohexanones are obtained.

*Example 2*

A mixture of ketones obtained by hydrogenating technical cresole followed by oxidation of the hydrogenation product is mixed with 10 per cent of the calculated amount of hydroxylaminesulfate in an aqueous solution of 15 per cent strength. While stirring strongly the mixture is neutralized at 0° C. to 5° C. with strong soda lye until its reaction is only just acid to litmus and the oily oxime mixture, which is practically free from ketones, is separated. After a new proportion of ketone mixture has been added the neutralization of the further liberated mineral acid is completed with sodium acetate. The separated oil is treated with alkali as in Example 1 to remove the oxime. The alcohol-containing ketone mixture is subjected to dehydrogenation. In this case also the yield is practically quantitative.

*Example 3*

An aqueous solution of hydroxylaminesulfate is mixed with a solution of d-menthone in methylene chloride and the mixture neutralized while stirring at 0° C. to 10° C. by gradually adding strong soda lye, the latter being replaced by sodium acetate at the end, when Congo red paper is only colored grey. After removing the methylene chloride by distilling in a low vacuum the d-menthoneoxime formed is filtered off. It is practically free from ketones. The rest of the hydroxylamine is reacted by adding a further amount of d-menthone in methylene chloride and neutralizing again. The mixture of d-menthone and d-menthoneoxime thus obtained is returned to step 1.

*Example 4*

In a cylindrical tube provided with a cooling jacket and a propeller, or similar stirring device, cyclohexanoneoxime and concentrated hydroxylamine sulfate solution (containing 170 grams of hydroxylamine per liter) are mixed continuously in the proportion of one mole of ketone to 1.1 moles of hydroxylamine. The neutralizing agent (potassium hydroxide of 25% strength) is added through capillary jets arranged in a row in the walls of the tube. The amount of lye added is regulated so that an acid reaction prevails throughout the entire tube, the acid concentration decreasing from top to bottom. In the lower end the pulpy reaction mass flows over a continuously working filter. The filtrate is led, together with the washing liquid, into a tank in which 0.15 mole of cyclohexanone (calculated on 1 mole of the original amount of ketone) is added. The mixture is again neutralized to a pH of about 4 and is then steam distilled. The distillate consists of cyclohexanone, cyclohexanoneoxime, and cyclohexanol. From the oily part of the distillate the oxime is extracted by means of alkali, and the alkaline extract is returned to the first step in the process. The mixture of ketone and alcohol is dehydrogenated for use in the first step.

*Example 5*

Aqueous hydroxylamine solution is obtained from hydroxylamine sulfate by the addition of sodium hydroxide. This solution is stirred at 0° to 10° C. with a mixture of cyclohexanone and cyclohexanoneoxime from a previous run, the ratio used being 1.1 mole of hydroxylamine to 1 mole of cyclohexanone, until the content of free ketone in the mixture ceases to decrease. The crystals of the oxime are removed by filtration and the hydroxylamine, which is still in the filtrate, is reacted with fresh cyclohexanone.

*Example 6*

A solution of hydroxylamine sulfate and hydroxylamine nitrate (containing 170 grams of hydroxylamine base per liter) is stirred with cyclohexanone at 0° to 5° C., in the ratio of 105 moles of the base to 100 moles of the ketone. Ammonia of 30% strength is poured into the mixture, while stirring and cooling, through a dropping tube until the resultant pulp of crystals is neutral to Congo red but acid to litmus. The mixture is stirred for another 30 minutes, filtered, and washed with a little water. The resulting product is chemically pure, and is obtained in 90% yield, based on the ketone used. To the combined filtrate and washing water another 8 moles of ketone is added, the mixture stirred for a short time and neutralized again until only slightly acid to litmus. The volatile organic compounds, cyclohexanone, cyclohexanol, and cyclohexanoneoxime are removed by steam distillation.

The nitrate content of this hydroxylamine lye facilitates conversion to fertilizer.

The high solubility of ammonium sulfate allows processing in very concentrated solutions, whereby a high yield is obtained in the first step of the process. A similar result is obtained if methylamine is used as the neutralizing agent.

*Example 7*

1 mole of cyclohexanone is mixed with 1 mole of strong soda lye and 1.1 moles of hydroxylamine in the form of hydroxylaminesulfate solution containing 160 grams hydroxylamine base per liter is added while cooling and stirring, the temperature being kept between 0 and 10° C. The separated oxime is filtered from the approximately neutral solution after the reaction has ended and is washed with water. The yield is about 92 per cent calculated on the ketone used. The filtrate is combined with the washing water and another 0.15 mole of ketone is added thereto. It is worked up as described in the preceding example.

I claim:

1. Process of producing oximes which comprises mixing an aqueous solution of hydroxylamine with less than the stoichiometric proportion of a cycloalkanone capable of forming an oxime, neutralizing the mixture, separating the oxime formed, adding an excess of said cycloalkanone to the remaining hydroxylamine solution and neutralizing again.

2. Process of producing oximes which comprises mixing an aqueous solution of hydroxylamine with less than the stoichiometric proportion of a cycloalkanone capable of forming an oxime, neutralizing the mixture, separating the oxime formed, adding an excess of said cycloalkanone to the remaining hydroxylamine solution, neutralizing again and steam distilling the mixture.

3. Process of producing oximes which comprises continuously mixing an aqueous solution of a hydroxylamine salt with less than the stoichiometric proportion of a cycloalkanone in the presence of an emulsifying agent causing the mixture to flow through a reaction vessel and gradually adding to the flowing mixture an alkaline liquid in an amount sufficient to render said mixture alkaline to Congo red but acid to litmus, separating the cyclic ketoxime formed, adding a surplus of said cycloalkanone to the remaining hydroxylamine solution and steam-distilling the mixture.

4. The process in accordance with claim 1 characterized in that the cycloalkanone is cyclohexanone.

5. The process in accordance with claim 1 characterized in that the cycloalkanone is d-menthone.

6. A process of producing oximes which comprises mixing an aqueous solution of hydroxylamine with less than the stoichiometric proportion of the mixture of ketones obtained by hydrogenating technical cresol followed by oxidation of the hydrogenated product, neutralizing the mixture, separating the oximes formed, adding an excess of said mixture of ketones to the remaining hydroxylamine solution and neutralizing again.

7. The process in accordance with claim 1 characterized in that the mixture is neutralized with ammonium hydroxide.

8. A process of producing oximes which comprises mixing an aqueous solution of a hydroxylamine salt with less than the stoichiometric proportion of cyclohexanone while maintaining a temperature between 0° C. and 10° C., neutralizing the resulting mixture by the addition of an aqueous ammonium hydroxide solution while maintaining the temperature within the range stated, said neutralization being carried to a point wherein the mixture is neutral to Congo red but acid to litmus, separating the oxime formed, adding an excess of said cyclohexanone to the remaining hydroxylamine salt solution and neutralizing again.

9. A process of producing oximes which comprises mixing an aqueous solution of a hydroxylamine salt with less than the stoichiometric proportion of d-menthone while maintaining a temperature between 0° C. and 10° C., neutralizing the resulting mixture with an alkaline medium while maintaining the temperature within the range stated thereby rendering said mixture neutral to Congo red but acid to litmus, separating the oxime formed, adding an excess of said d-menthone to the remaining hydroxylamine salt solution and neutralizing again.

10. A process of producing oximes which comprises mixing at a temperature between 0° C. and 10° C. an aqueous solution of a hydroxylamine salt with less than the stoichiometric proportion of a mixture of ketones obtained by hydrogenating technical cresol followed by oxidation of the hydrogenated product, neutralizing the resulting mixture with an alkaline solution while maintaining the temperature within the range stated thereby rendering the solution neutral to Congo red but acid to litmus, separating the oxime formed, adding an excess of said mixed ketones to the remaining hydroxylamine salt solution and neutralizing again.

PAUL SCHLACK.